United States Patent [19]

Gregory

[11] Patent Number: 5,249,474
[45] Date of Patent: Oct. 5, 1993

[54] POWER TAKEOFF AND ELECTROMECHANICAL SHIFTER THEREFOR

[75] Inventor: Ted W. Gregory, Libertyville, Ill.

[73] Assignee: Arens Controls, Inc., Evanston, Ill.

[21] Appl. No.: 844,237

[22] Filed: Mar. 2, 1992

[51] Int. Cl.$^5$ .............................................. B60K 17/28
[52] U.S. Cl. .................................... 74/15.66; 74/89.15
[58] Field of Search ................ 74/11, 15.6, 15.63, 74/15.66, 15.69, 15.8, 15.82, 15.86, 89.15; 192/109 A

[56] References Cited

U.S. PATENT DOCUMENTS

| | | | |
|---|---|---|---|
| 1,324,592 | 12/1919 | Hicks | 74/15.66 X |
| 3,198,301 | 8/1965 | Randall | 192/109 A X |
| 3,277,734 | 10/1966 | Bernard | 74/15.86 X |
| 4,449,416 | 5/1984 | Huitema | 192/109 A X |
| 4,498,350 | 2/1985 | Ross | 74/89.15 |

*Primary Examiner*—Richard M. Lorence
*Attorney, Agent, or Firm*—Tilton; Fallon; Lungmus

[57] ABSTRACT

A power takeoff (PTO) assembly equipped with an electromechanical shifter for moving a pinion gear of the PTO assembly into and out of engagement with a drive gear of that assembly or of a vehicle transmission on which the assembly is mounted. The PTO assembly includes a telescoping shock shaft having a first shaft section axially advanced by a power-driven linear actuator and operatively connected to a second shaft section equipped with a fork for urging the pinion gear laterally into (and out of) engagement with the drive gear. Between the two shaft sections is a compression spring that stores energy by compressing until a condition of alignment between the pinion and drive gears occurs, at which time the stored energy of the spring releases and quickly shifts the pinion gear into meshing engagement with the drive gear. Also disclosed as part of the linear actuator is a load-limiting and time-delay circuit for protecting the system should intermeshing fail to occur within a predetermined interval and before a preselected load condition is exceeded.

12 Claims, 4 Drawing Sheets

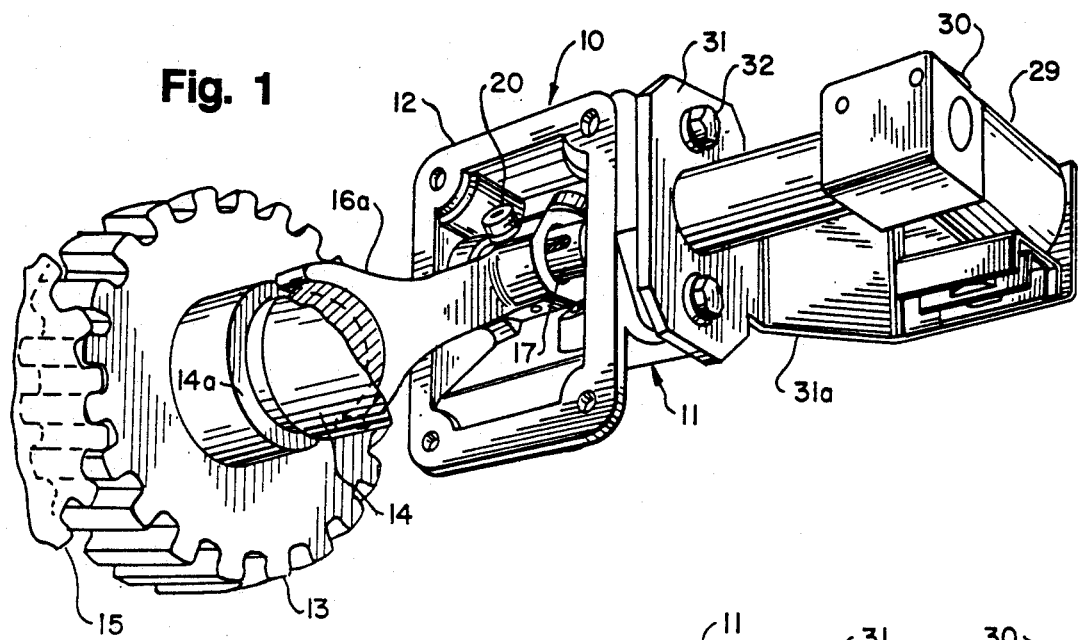
Fig. 1
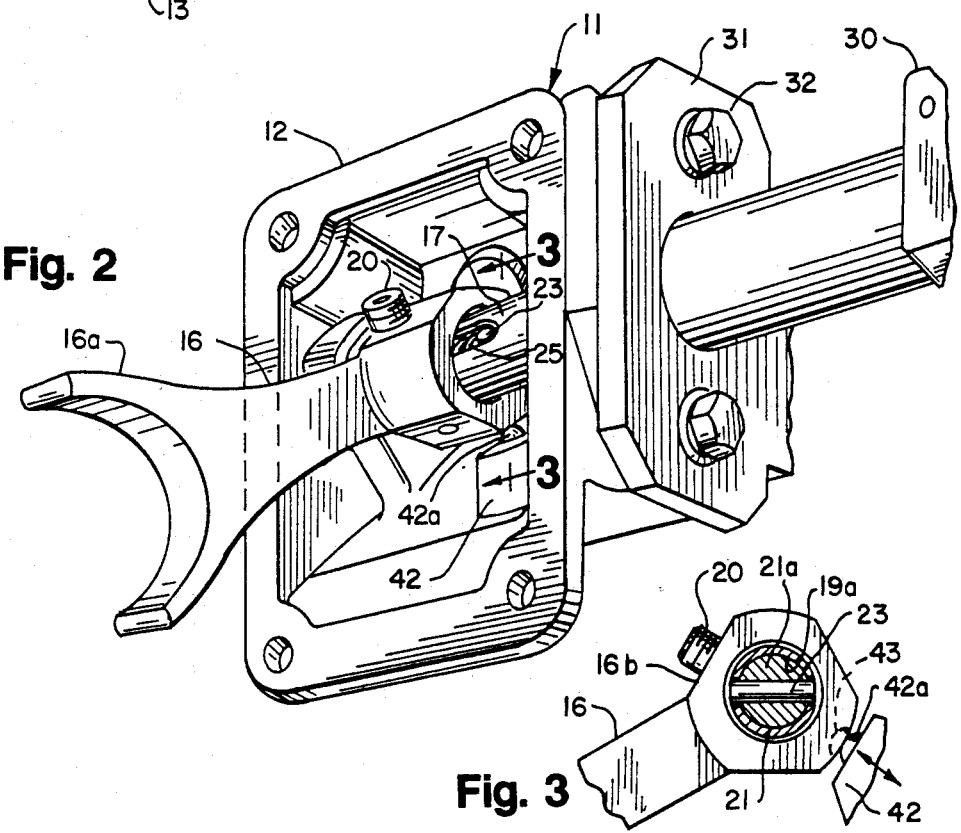
Fig. 2
Fig. 3

POWER TAKEOFF AND ELECTROMECHANICAL SHIFTER THEREFOR

BACKGROUND AND SUMMARY

A power takeoff (PTO) is a mechanism commonly used on trucks, tractors, militiary vehicles, and a wide variety of vehicles used for agriculture, mining, heavy construction, and industry for transferring power from an engine to any of a variety of accessories such as hydraulic pumps, pulleys, winches, jackshafts, and the like. In each case, the PTO consists essentially of a small power transmission that is operatively connected to the main transmission of the vehicle. A gear of the PTO, which may be referred to as the PTO drive gear, engages one of the driven gears of the transmission and is usually continuously driven while the engine is operating unless the clutch is disengaged.

Within the housing of the PTO is a pinion gear capable of being shifted into and out of intermeshing engagement with the PTO's drive gear, an operation generally performed by movement of an external lever operatively connected to the pinion by means of a shift fork. In a typical PTO application, such as in a dump-type truck, the dumper box is raised and lowered by a hydraulic cylinder connected to a pump. With the vehicle engine operating and the lever shifted so that the PTO's pinion gear engages the rotating PTO drive gear, the pump delivers hydraulic fluid to or from the cylinder to lift or lower the dumper box..

The prior art includes both direct and remote means for shifting a PTO. In simpler constructions, an extension arm is connected directly to the PTO's operating lever so that the pinion gear may be shifted into and out of engagement with the drive gear by manually moving the extension arm. While such an arrangement has the advantages of simplicity, it also has the disadvantage of requiring a vehicle operator to leave the cab of the vehicle, with the engine running and the controls of the vehicle unintended, during PTO operation. Also, in some installations the location of the PTO lever may make it difficult if not impossible to attach a manually-operable extension arm.

Known remote control systems include mechanical linkages, flexible cables, and compressed air systems. While such systems all offer the advantages of remote operation, those advantages may be offset to a greater or lesser extent by a variety of disadvantages. Thus, mechanical linkages are usually expensive to make and install because they are often custom fabricated for each type of vehicle and may be difficult and time consuming to attach and adjust. Also, such linkage systems tend to be susceptible to damage, with even minor deformations or maladjustments rendering such systems inoperable.

Push-pull controls of the flexible cable type are usually less expensive than rigid linkage systems but they are also costly to install since such a control cable and its sheath must be carefully routed through the vehicle, and final adjustments must be carefully made, to achieve proper operation. Should the cable become kinked in use, or should the manual control be abused by rough handling, inoperability of such a system may easily result.

Compressed air systems require relatively expensive cylinders, valves, and high pressure hoses. While such a system is relatively simple, it demands a vehicle equipped with an air compressor and it also necessitates careful routing of all hoses so that they will not be exposed to heat or abrasion.

Other systems that have been attempted include hydraulic systems and electromechanical shifters. Hydraulic systems have been largegly rejected because of their high expense, and electromechanical shifters, including solenoids, electric motors, and linear actuators of one type or another have been found generally unacceptable because of unreliability and insufficient operating life.

One aspect of this invention lies in the discovery that previous efforts to utilize electromechanical means in remote control systems for PTOs have generally failed because they did not take into full account the high loads and gear-damaging impact forces that develop should the teeth of a PTO pinion gear fail to mesh instantly with those of a PTO drive gear. Ordinarily, such gears are mounted on parallel shafts with the pinion gear being shifted laterally or axially into and out of engagement with the rotating drive gear. Often the gears do not mesh smoothly but rather toothface hits toothface for a jam condition referred to as a "clash" shift. Mechanisms capable of shifting the pinion with considerable force, including hydraulic and electromechanical systems, would be expected only to exacerbate the problem by increasing the likelihood of wear and damage to the teeth of the gears under repeated clash conditions.

This invention also lies in the further discovery that an electromechanical linear actuator, despite its relatively slow operation and the high forces it is capable of generating, may be ideally suited for use in shifting the pinion of a PTO into meshing engagement with a rotating drive gear if some means could be provided for storing energy from the moment of clash contact and until tooth alignment occurs, at which time the stored energy might be instantly released to shift the gears together. Under such circumstances, the potentially damaging effects of a clash shift would be avoided.

The electromechanical shifter of this invention is used in combination with a PTO having a housing adapted for connection to a vehicle transmission and containing a drive gear that is rotated by the transmission when the transmission is in operation. The PTO also includes a pinion gear mounted for axial movement in the housing between engaging and disengaging positions relative to the drive gear. Briefly, the electromechanical shifter includes a shock shaft having telescoping first and second sections each mounted for axial movement relative to the housing. A positioning arm, which may include a fork portion at its end, is carried by the second section and is engagable with the pinion for urging it towards intermeshing engagement with the drive gear when the second section is shifted axially in one direction. Electrically-powered linear actuator means is coupled to the first section for progressively shifting the same axially in said one direction when the actuator means is energized. Compression spring means is operatively interposed between the first and second sections of the shock shaft for gradually storing increasing levels of energy by compressing when the pinion gear is shifted axially into clashing contact with the drive gear and for quickly releasing such stored energy to move the pinion gear into intermeshing engagement with the drive gear when a condition of alignment for allowing such intermeshing engagement occurs.

Means are also provided for limiting the maximum force that the linear actuator may apply in a clash situation and the maximum duration of the interval of force application. In the embodiment disclosed, both functions are performed by the electrical circuitry of the linear actuator, with a transistor controlling the maximum electrical load under clash conditions and an RC time delay circuit limiting the duration of operation of the actuator, to insure that even under conditions of less than maximum load a clash condition cannot exist for more than a predetermined interval.

Other features, advantages, and objects of the invention will appear from the specification and drawings.

DRAWINGS

FIG. 1 is a perspective view of an electromechanical shifter embodying this invention, such shifter being illustrated in combination with the pinion and drive gears of a PTO mechanism.

FIG. 2 is an enlarged fragmentary view of the electromechanical shifter.

FIG. 3 is a cross sectional view taken along line 3—3 of FIG. 2.

DETAILED DESCRIPTION OF PREFERRED EMBODIMENT

Figure 4:
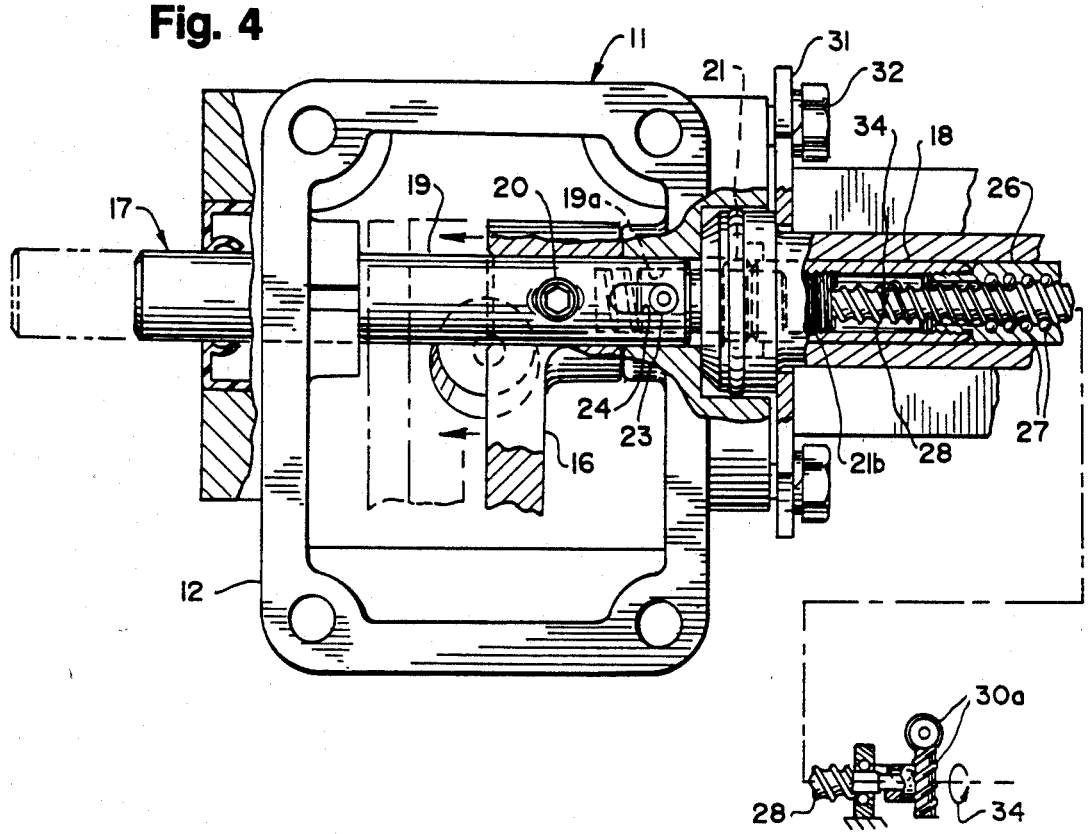
FIG. 4 is an enlarged elevational view, shown partly in section, of the electromechanical shifter in its inactivated state.

Referring to FIG. 1, the numeral 10 generally designates a PTO assembly including, as a main component thereof, electromechanical shifter 11. The shifter includes a housing 12 adapted to be secured to, and become a part of, the PTO transmission housing (omitted for clarity of illustration). within the PTO transmission housing is a pinion gear 13 carried by shaft 14. Gear 13 is shown in meshing relation with drive gear 15 of the PTO. Drive gear 15 is in constant meshing engagement with a suitable gear of the vehicle transmission to which the PTO is connected and, when the vehicle's engine is operating, drive gear 15 continuously rotates unless the vehicle's clutch is disengaged. In theory, gear 15 might therefore be a gear of the vehicle's transmission rather than a gear of the PTO, and it should be understood that such an option is contemplated by this disclosure. As a practical matter, since a PTO is generally available as an attachment or accessory, rather than as an integrated part of a vehicle transmission, drive gear 15 would ordinarily take the form of a gear element of the PTO rather than of the basic transmission.

Figure 6:
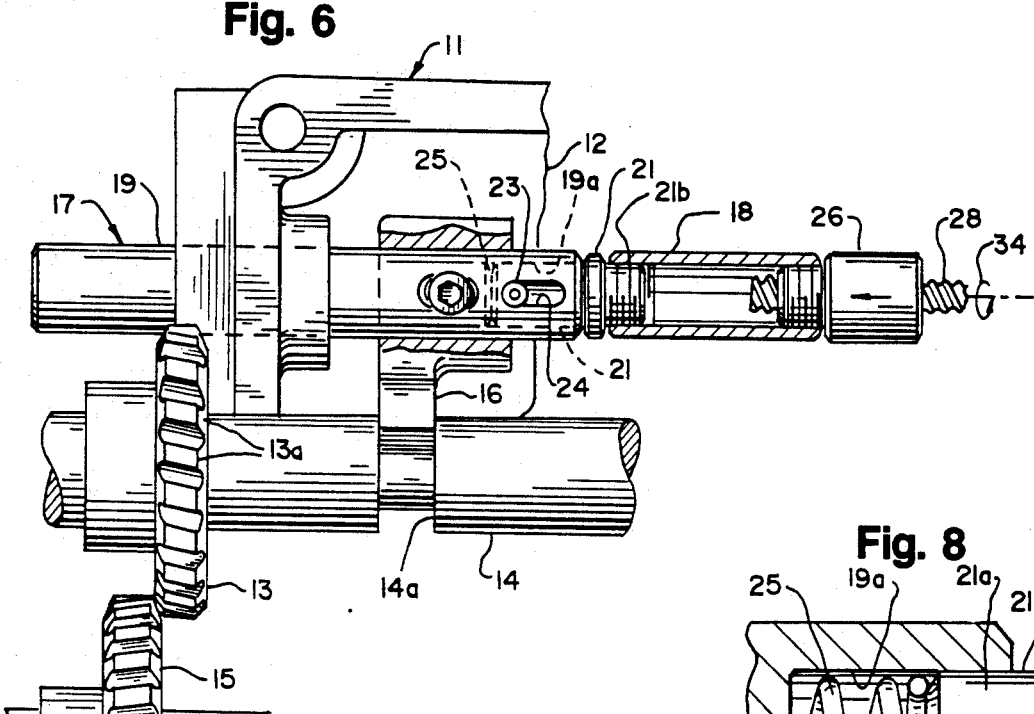
FIG. 6 is a fragmentary sectional view depicting the shifter, and the PTO assembly of which it is a part, when the shifter has been activated and the gears of the PTO brought into clashing contact.
Figure 7:
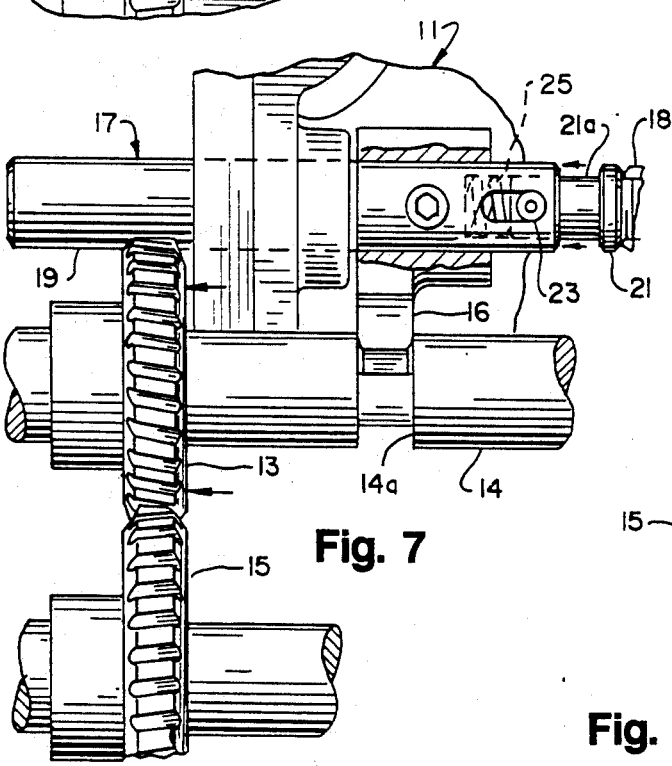
FIG. 7 is a fragmentary view similar to FIG. 6 but showing the relationship of gears after the stored energy of the shifter spring has been released and the gears are in meshing engagement.
Figure 9:
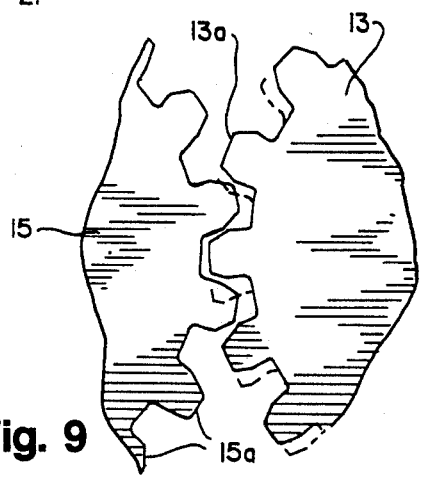
FIG. 9 is a schematic view showing the teeth of a pair of gears and illustrating the shifting of such gears from clashing contact into intermeshing engagement.

As indicated in FIG. 1, and as shown in FIGS. 6 and 7, gears 13 and 15 are parallel and are engaged and disengaged by axial movement of shaft 14 and pinion gear 13. Conventional means (not shown) are provided for supporting pinion gear 13 for axial and rotational movement. The forked end 16a of an arm 16 extends from shifter housing 12 and is received in an annular recess 14a formed in shaft 14. The arm is in turn carried by one section of a shock shaft assembly 17 that has its axis parallel to that of pinion shaft 14 (FIG. 6).

The shock shaft assembly 17 is composed of a first section 18 and a second section 19. The second section is slidably supported by housing 12 and arm 16 is secured to that section by means of screw 20. One end of the second section is provided with a socket 19a that slidably receives one end 21a of fitting 21. The opposite end 21b of the fitting is threaded and is secured to the first section 18 of the shock shaft assembly.

Figure 5:
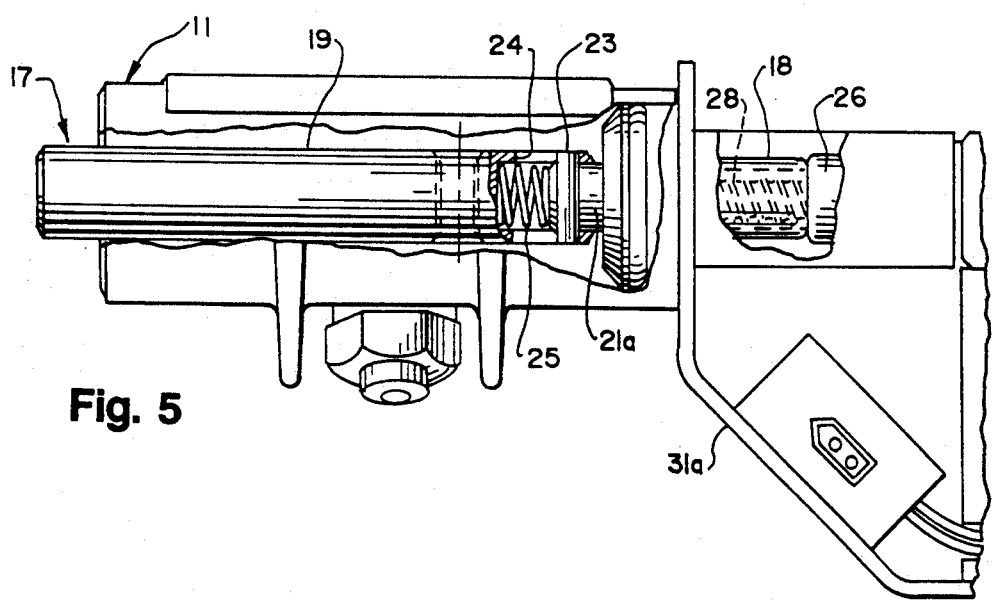
FIG. 5 is a top plan view, shown partly in section, of the electromechanical shifter of FIG. 4.
Figure 8:
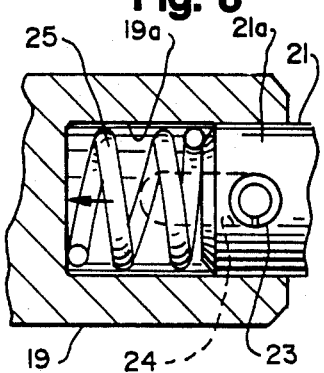
FIG. 8 is an enlarged fragmentary sectional view showing the shifter spring when the energy of the spring is released.

As shown most clearly in FIGS. 5 and 8, end portion 21a of fitting 21 is equipped with a transverse pin 23, the ends of which project laterally from the fitting and are received in diametrically-disposed slots 24 formed in the wall of shock shaft section 19 in the area of socket 19a. Compressible and elastically-recoverable energy-storing means 25 which, in the embodiment shown, takes the form of a helical compression spring, is received in the socket and urges fitting 21 axially into the extended position depicted in FIGS. 4, 5, 8, and 9.

Shaft section 18 is hollow and is threadedly connected at its opposite end (i.e., the end opposite fitting 21) to the ball nut 26 of a linear actuator assembly. As shown in FIGS. 1 and 4, ball nut 26 contains bearings 27 that are received in the track of screw shaft 28 that is rotated by an electric motor 29 equipped with a worm gear housing 30 in which conventional worm gears 30a operatively connect the motor to the screw shaft. Housing 30 for the motor and screw shaft is in turn securely connected by faceplate 31 and bolts 32 to shifter housing 12. A bracket extension 31a of the faceplate is connected to the motor 29 to support the motor as shown in FIG. 1.

Figure 10:
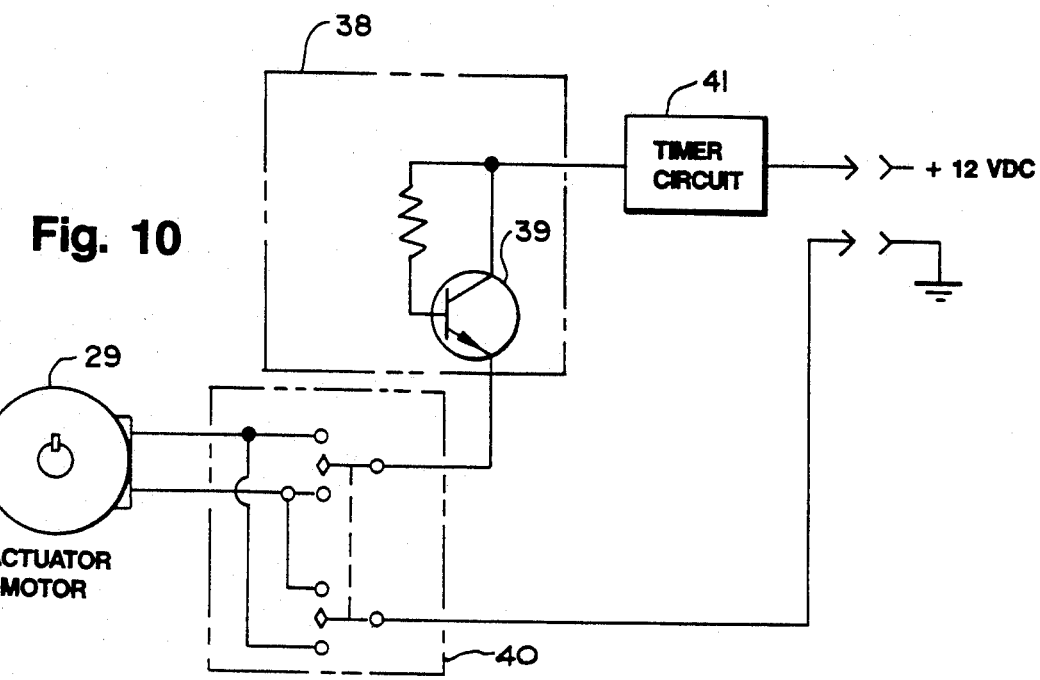
FIG. 10 is a schematic view of the load-limiting and time circuitry for further protecting the system of this invention.

FIGS. 4 and 5 depict the electromagnetic shifter in an inoperative position with the PTO disengaged. Under such conditions, with the engine running and the clutch engaged, PTO drive gear 15 normally rotates under the power of the vehicle engine and out of engagement with PTO pinion gear 13. When engagement of the PTO is desired, the operator presses rocker switch 40 (FIG. 10) in the vehicle cab or other remote location to energize motor 29 and cause screw shaft 28 to rotate in the direction of arrow 34 (FIGS. 4, 6). As shock shaft section 18 and fitting 21 advance (to the left, as shown in FIGS. 4–6) shock shaft section 19 is also advanced axially, shifting arm 16, pinion shaft 14, and pinion gear 13 towards drive gear 15.

When the pinion gear 13 and drive gear 15 contact each other, meshing of their teeth may occur immediately. In that case, the linear actuator simply advances the pinion gear slowly into full meshing engagement with the drive gear. Bearing in mind, however, that drive gear 15 is rotating and pinion gear 13 is non-rotating, at least prior to contact with the drive gear, a clash engagement is more likely to occur. In such a clash engagement, the teeth 13a of the pinion gear 13 are not perfectly aligned with the teeth 15a of drive gear 15, with the teeth of the pinion gear assuming the positions depicted by broken lines in FIG. 9. Under such circumstances, axial advancement of the pinion gear will be blocked until tooth alignment occurs. Continued operation of the linear actuator causes fitting 21 to commence compression of coil spring 25 since axial movement of the shock shaft section 19 is temporarily blocked by the clashed gears. As the spring compresses, and as motor 29 under load draws more current, the axial force applied to pinion gear 13 progressively increases with the spring 25 and motor circuitry serving to store energy until the moment when the gear teeth move into alignment and the stored energy is quickly released to shift pinion gear into full meshing engagement with drive gear 15. When the gears are fully meshed, a light (not shown) at the remote location is illuminated to signal to the operator that the PTO is fully engaged. The remote-location signal light is wired to a contact switch 42 having a contact element 42a which engages the hub 16b of arm 16 and which springs outwardly into recess 43 to close the signal light circuit when pinion gear 13 has been advanced into full meshing engagement with drive gear 15.

In the operation as so described, the shifter motor 29 is activated without disengaging the clutch of the vehicle. Should the operator instead disengage the clutch at the time the shifter mechanism is being activated, then drive gear 15 will be stationary as the non-rotating pinion gear 13 of the PTO is advanced by the shifter mechanism. If a clash condition develops, spring 25 will again compress and motor 29 under load will draw increasing amounts of current, with both the spring and the motor circuitry storing engergy until the moment when the gear teeth are moved into alignment and the energy may be quickly released to shift the pinion gear into meshing engagement with the drive gear. That moment occurs when the operator, observing that the remote-location signal light is not lit, simply jogs the clutch to cause rotation of drive gear 15 and allow the stored energy of the spring and circuit to shift the pinion gear 13 into meshing engagement with the drive gear.

Figure 11:
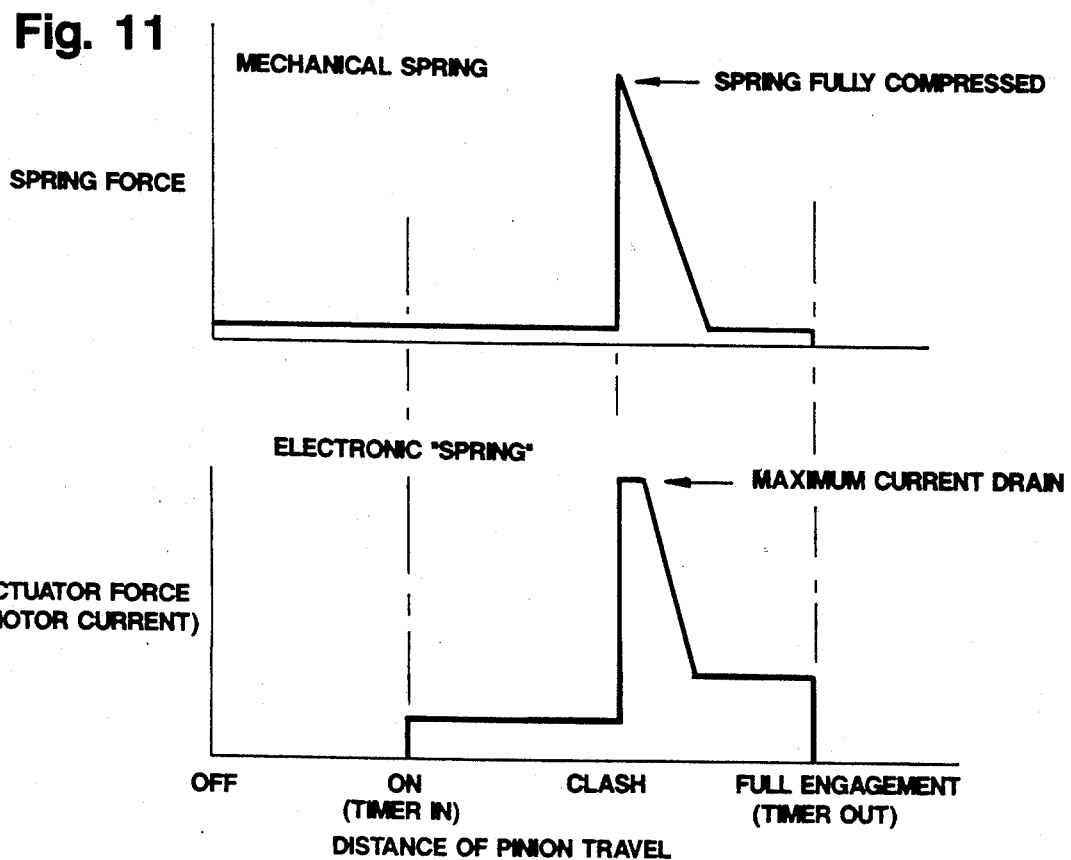
FIG. 11 is a double graph depicting the energy storing action of the shifter spring and electronic circuitry under clash conditions.

Both the mechanical spring means 25 and the electronics of the motor circuit act as energy stores. The double graphs of FIG. 11 schematically depict the simultaneous buildup of forces and the storing of energy in a clash situation, and the release of such energy upon meshing engagement following such a clash. Both the mechanical spring and the electronic "spring" operate to store energy only in a clash-type shift. The current of the electronic spring is directly proportional to the force of the motor and, hence, to the force generated by the linear actuator. The actions of both the mechanical and electronic springs are additive and complementary to the same task.

By storing energy, the springs are able to shift the pinion gear into meshing engagement with the drive gear far more quickly than would occur if spring 25 were omitted and movement of the pinion gear were controlled solely by the linear actuator.

The mechanical spring 25 along with the circuitry for the linear actuator motor 29 limit the force of clash engagement between the gears. That force progressively increases as the spring 25 becomes compressed, and as the current drawn by the motor increases, but is limited to a selected maximum force by the stiffness of the spring and by a current limiter 38 built into the electrical circuit for actuator motor 29. Specifically, a current-limiting transistor 39 of any known type is selected to limit the current flow so that the load cannot exceed a force of, say, 125 pounds. In addition, the circuit includes a conventional RC timer circuit 41 that limits the operation of the motor 29 to an interval during which proper meshing of the gears would be expected to occur. For example, if the system is designed so that spring 25 becomes fully compressed in three seconds of operation of motor 29, the timer circuit may be designed to reverse the motor after a total interval of five seconds if meshing has not occurred. Under such circumstances, there would be two additional seconds for the gears to intermesh under the full combined force of the compression and electronic springs if such intermeshing had not occurred previously.

While the electrically-powered linear actuator is of conventional construction, it is not believed to have been known in the past to utilize such an actuator in shifting the gears of a PTO. Such linear actuators, although capable of generating considerable force, operate relatively slowly. By combining such an actuator with compressible and elastically-recoverable means 25, preferably in the form of a stiff helical compression spring, the compression means and the circuitry of the actuator may store energy until the teeth of the gears are aligned and such energy may then be released to snap the pinion gear into intermeshing engagement with the drive gear. Therefore, despite the relatively slow operating speed of a conventional linear actuator, such an actuator may be used effectively for shifting gears while at the same time eliminating or greatly reducing the possibilities of gear damage should clashing occur.

While a linear actuator of a particular type has been shown and described, it will be understood that other types of electrically-powered linear actuators may be used for shifting the pinion gear 13 axially into and out of meshing engagement with drive gear 15. Also, while a helical compression spring 25 has been found particularly effective as the mechanical spring means for storing energy in a clash situation and quickly releasing that energy when the clash condition is relieved, other types of spring means capable of performing similar functions may be used.

While in the foregoing I have disclosed an embodiment of the invention in considerable detail for purposes of illustration, it will be understood by those skilled in the art that many of these features may be varied without departing from the spirit and scope of the invention.

I claim:

1. In combination, a PTO adapted for connection to a vehicle transmission and having a drive gear rotated by said transmission when the transmission is in operation; said PTO also including pinion gear means mounted for axial movement between engaging and disengaging positions relative to said drive gear; and electromechanical shifter means for axially shifting said pinion gear means; said electromechanical shifter means including a housing and a shock shaft having telescoping first and second sections each mounted for axial movement relative to said housing; arm means carried by said second section engagable with said pinion gear means for urging the same towards intermeshing engagement with said drive gear when said second section is shifted axially in one direction; electrically-powered actuator means coupled to said first section for progressively shifting said first section axially in said one direction; and compression spring means operatively interposed between said first and second sections for storing energy by compressing when said pinion gear means is shifted axially into clashing contact with said drive gear and for releasing said stored energy to move said pinion gear means into intermeshing engagement with said drive gear when a condition of alignment for such intermeshing engagement occurs; said electrically-powered actuator means including a reversible electric motor and circuit therefor for shifting said pinion gear into and out of meshing engagement with said drive gear and for storing energy in the form of progressively increasing current levels when said pinion gear and drive gear are in clashing contact.

2. The combination of claim 1 in which said circuit includes current-limiting means for limiting the maximum current available to said electrically-powered actuator means under clashing conditions.

3. The combination of claim 1 in which said spring means comprises a helical compression spring.

4. The combination of claim 3 in which said helical compression spring is located in a socket at one end of one shaft section; the other of said shaft sections including a fitting axially slidable in said socket and engagable with said spring.

5. The combination of claim 4 in which said socket has walls with diametrically-aligned longitudinal slots therein; said fitting having a transverse pin with end portions received in said slots for limiting the extent of axial movement of said fitting within said socket.

6. The combination of claims 1 or 2 in which said actuator means is a linear actuator having a screw shaft driven by said motor; and means operatively engaging said screw shaft and connected to said first section of said shock shaft for shifting said shock shaft axially when said screw shaft is rotated.

7. An electromechanical shifter for shifting an axially-movable pinion gear into and out of meshing engagement with a rotating drive gear of a PTO assembly, comprising a shock shaft having telescoping first and second sections mounted for axial movement with respect to said PTO assembly; arm means carried by said second section for moving said pinion gear towards meshing engagement with said drive gear when said second section is urged axially in one direction; electrically-powered actuator means coupled to said first section for progressively shifting said first section axially in said one direction when said actuator means is energized; and compression spring means operatively interposed between said first and second sections for storing energy by compressing when said pinion gear is shifted axially into clashing non-meshing contact with said rotating drive gear and for quickly releasing said stored energy to move said pinion gear into meshing engagement with said drive gear when a condition of alignment for such meshing engagement occurs; said actuator means including a reversible electric motor and circuit therefor for shifting said pinion gear into and out of meshing engagement with said drive gear and for storing energy in the form of progressively increasing current levels when said pinion gear and drive gear are in clashing contact.

8. The combination of claim 7 in which said circuit includes current-limiting means for limiting the maximum current available to said electrically-powered actuator means under clashing conditions.

9. The combination of claim 7 in which said spring means comprises a helical compression spring.

10. The combination claim 9 in which said helical compression spring is located in a socket at one end of one shaft section; the other of said shaft sections including a fitting axially slidable in said socket and engagable with said spring.

11. The combination of claim 10 in which said socket has walls with diametrically-aligned longitudinal slots therein; said fitting having a transverse pin with end portions received in said slots for limiting the extent of axial movement of said fitting within said socket.

12. The combination of claims 7 or 8 in which said actuator means is a linear actuator having a screw shaft driven by said motor; and means operatively engaging said screw shaft and connected to said first section of said shock shaft for shifting said shock shaft axially when said screw shaft is rotated.

* * * * *